United States Patent [19]

Calkins

[11] 4,144,302

[45] Mar. 13, 1979

[54] PROCESS FOR PREPARING INJECTION MOLDABLE THERMOSETTABLE COMPOSITION

[75] Inventor: Thornton R. Calkins, Pittsfield, Mass.

[73] Assignee: General Electric Company, Pittsfield, Mass.

[21] Appl. No.: 707,542

[22] Filed: Jul. 22, 1976

Related U.S. Application Data

[63] Continuation-in-part of Ser. No. 500,113, Aug. 23, 1974, Pat. No. 3,978,012, which is a continuation-in-part of Ser. No. 303,844, Nov. 6, 1972, abandoned.

[51] Int. Cl.$^2$ .................. C08G 8/00; B29H 21/04
[52] U.S. Cl. .................. 264/130; 264/142; 264/211; 264/300
[58] Field of Search .......... 260/19 R; 266/347, 176 F, 266/211; 427/222; 264/130, 300, 142

[56] References Cited

U.S. PATENT DOCUMENTS

| 2,839,422 | 6/1958 | Beyer et al. | 427/222 |
| 2,857,624 | 10/1958 | Hanzel et al. | 264/211 |
| 2,943,068 | 6/1960 | Freedman | 260/19 |
| 2,972,780 | 2/1961 | Boonstra | 264/26 |
| 3,054,142 | 9/1962 | Hinderer et al. | 264/174 |
| 3,078,511 | 2/1963 | Street | 264/349 |
| 3,103,700 | 9/1963 | Halverson et al. | 264/142 |
| 3,233,025 | 2/1966 | Frye et al. | 264/142 |
| 3,340,339 | 9/1967 | Ullman | 264/142 |
| 3,461,490 | 8/1969 | Cottingham | 264/236 |
| 3,632,537 | 1/1972 | Paleologo et al. | 260/19 |
| 3,928,525 | 12/1975 | Fuwa et al. | 264/174 |
| 3,971,863 | 7/1976 | Calkins | 427/222 |

FOREIGN PATENT DOCUMENTS 1066736 10/1959 Fed. Rep. of Germany .......... 427/222

Primary Examiner—Jay H. Woo
Attorney, Agent, or Firm—William F. Mufatti

[57] ABSTRACT

An injection moldable phenol aldehyde resin composition in pellet form having a diameter of at least 1/16 of an inch and having in admixture with the pellets a metallic salt of a long chain fatty acid and to a process for preparing such composition in pellet form.

9 Claims, No Drawings

PROCESS FOR PREPARING INJECTION MOLDABLE THERMOSETTABLE COMPOSITION

This application is a continuation-in-part application of Patent Application Ser. No. 500,113, filed Aug. 23, 1974, now U.S. Pat. No. 3,978,012 which in turn is a continuation-in-part application of Patent Application Ser. No. 303,844, filed Nov. 6, 1972 and now abandoned.

This invention is directed to an injection moldable phenolic composition in pellet form and to a process for preparing the injection moldable composition in pellet form.

BACKGROUND OF THE INVENTION

Phenolic molding compositions have been available for many years and generally consist of phenol-formaldehyde resin blended with various fillers. The molding compositions are prepared by blending a one-stage or two-stage phenol-formaldehyde resin with fillers and then working the material between differential hot rolls in order to soften the resin and obtain a more uniform blend of the constituents. The composition is then cooled, crushed, and screened for some degree of uniformity of particle size. Unfortunately, such molding compositions are dusty, lack uniform size, and do not blend themselves readily to the new method of injection molding of thermosettable resins. The time of contact with the hot rolls is critical, and the process does not result in a uniform blend of all the constituents as well as being costly because of the many steps to the final molding composition.

DESCRIPTION OF THE INVENTION

It has now been discovered that by converting a phenol-aldehyde molding composition into a particular pellet form, a composition is obtainable which can be injection molded with ease, has a high density and thus compacts better for ease of loading and packing, and also presents a better product. The injection moldable composition of this invention is obtained by extruding a phenol-aldehyde molding composition into a dry solid pellet form of at least 1/16 inch in diameter. The process consists of feeding a heat fusible thermosettable phenol-aldehyde molding composition consisting of a phenol-aldehyde novolac, a cross-linking agent and fillers to a screw extruder fitted with a die orifice, advancing the composition through the extruder while subjecting the composition to a temperature sufficient to render the phenol-aldehyde novolac molten, extruding the phenol-aldehyde composition through the die orifice of the extruder and comminuting the extrudate into pellets of at least 1/16 inch in diameter. Alternatively, the extrudate as it is pelletized may be subjected to rapid cooling.

PREFERRED EMBODIMENT OF THE INVENTION

The following examples are set forth to illustrate more clearly the principle and practice of this invention to those skilled in the art and unless otherwise specified, where parts or percentages are mentioned, they are parts or percentages by weight.

EXAMPLE I

A phenol-formaldehyde resin is prepared by reacting about 0.7 moles of formaldehyde per mole of phenol in the presence of an acid catalyst, which is subsequently neutralized, to form a novolac.

The novolac is ground to a fine particle size with about 16 weight percent of hexamethylenetetramine based on the weight of novolac. The resin mixture is then blended with about 35 weight percent of asbestos fibers and about 15 percent weight of wood flour to form a 50/50 mixture. The blend is then compounded in a screw extruder at about 220° F. which is sufficient to melt the resin. The molten mixture is advanced through the screw and extruded through a die orifice of about ⅛ inch in diameter. The extrudate is then comminuted into pellets of about ⅛ inch long. The pellets are cooled rapidly to prevent advancement in molecular weight of the resin and to prevent coagulation of the pellets. The pellets are essentially uniform in size.

The pellets are then blended with 0.1 weight percent of zinc stearate based on the weight of the pellets.

The pellets have a bulk factor of 2.12 as determined by dividing molded density of molded article by the apparent density of the pellets in accordance with ASTM Test Procedure D1895, Method B.

EXAMPLE II

Example I is repeated except that no zinc stearate is employed herein.

EXAMPLE III

Example I is repeated except that the 50/50 blend of resin and fillers is not compounded in a screw extruder but is compounded on heated differential rolls of about 220° F. The compounded material is cooled and then is ground in a rotary cutter. The ground material is screened, and the portion between 10 and 70 mesh collected as product. The largest particle size is less than ⅛ inch diameter.

The resin composition is then blended with 0.1 weight percent of zinc stearate in the same manner as in Example I. The bulk factor of the composition is 2.35.

EXAMPLE IV

Example I is repeated except that 0.1 weight percent zinc stearate is mixed with the resin and fillers before compounding in a screw extruder and pelletized. The formed pellets are not mixed with zinc stearate as in Example I.

EXAMPLE V

The materials of Examples I – IV are injection molded using a screw injection molding apparatus at a temperature of about 210° F. with a mold cavity temperature of 340° F. Each of the materials so prepared in Examples I – IV is separately fed to the feed hopper of the screw injection molding apparatus. The results are as follows:

| Sample | Results |
| --- | --- |
| Example I | - molds smoothly with uniform molded part weight for 30 minutes. |
| Example II | - within five (5) minutes, injection rate becomes erratic, parts are underweight and incompletely filled, rate of screw advancement slows down and finally stops within about 10 minutes after starting injection molding. |
| Example III | - same results occur as with material of Example II except that, in addition, there is extreme dusting around the apparatus from the material. |
| Example IV | - same results occur as with material of |

| Sample | Results |
|---|---|
| | Example II. |

EXAMPLE VI

Example IV is repeated except that 2.0 weight percent of zinc stearate is used herein instead of 0.1 weight percent.

When this is injection molded using the same screw injection molding machine as in Example V under the same conditions, the results are exactly the same as obtained with the material of Example II, namely very poor injection molding.

The instant invention is directed to a particular thermosettable injection molding composition consisting of in admixture (1) a heat fusible phenol-aldehyde resin composition in pellet form of at least 1/16 inch in diameter and (2) a minor amount of a metallic salt of a long chain fatty acid of 12–30 carbon atoms. The phenol-aldehyde resin composition can have therewith fillers such as asbestos filler, talc, cellulose fibers, etc. or mixtures thereof. The amount of the metallic salt of the long chain fatty acid can range from about 0.05 to about 2.0 weight percent based on the weight of the pellets. The critical feature of the instant invention is the pellet form of the molding composition and particularly the size, and the metallic salt of the long chain fatty acid. It is this basic combination that provides for a thermosettable composition for injection molding which heretofore has not really been commercially available for such processing as are the thermoplastic materials. The metallic salt of the long chain fatty acid may be in admixture with the pellets or it may consist of a coating on the pellets.

The interesting feature of the pellets is that they are dense, have a relatively smooth surface and are uniform in size. This lends itself to providing the characteristic of being injection moldable when used in combination with the metallic salt of the long chain fatty acid. As shown in the Examples, when trying to injection mold a thermosettable composition in pellet form but without the use of a metallic salt of a long chain fatty acid such as zinc stearate, the results were very poor, with poor molded parts, and in a short period of time the injection molding machine shut down. It could not be started again until the machine was cleaned out. Further, as shown in the Examples, when attempting to mold a thermosettable composition in conventional form, namely screened ground composition which has particles of less than 1/16 inch in diameter, poor molding characteristics resulted. Even when using zinc stearate, for example, with the molding composition as conventionally prepared as shown in Example III, the molding characteristics are poor. This is shown in the Example V. Increasing the amount of zinc stearate does not appreciably aid the characteristics of molding compounds in conventional form.

As further demonstrated in the Examples, the blending of zinc stearate with the ingredients in the screw extruder so that the zinc stearate is uniformly blended within the pellet, does not aid in the injection molding characteristics of the pellets. The zinc stearate must be externally mixed with the pellets in order to achieve an injection moldable thermosettable phenol-aldehyde composition.

It has also been noted that the injection moldable pellets of this invention have a comparatively smooth surface, have a high density, the ingredients are uniformly blended in each pellet and the pellets are of essentially uniform size. The high density produces a low bulk factor which results in better feeding of the pellets to the injection molding machine and better packing when packaging. Bulk factor is calculated on the basis of the apparent density of the molding composition before molding and the density of the molded shape. It is a dimensionless number and is calculated as follows:

$$\text{Bulk factor} = \frac{\text{molded density of article in grams/cc}}{\text{apparent density of molding composition in grams/cc}}$$

The higher the density of the molding composition, the lower the bulk factor.

In addition, it has also been observed that when using a phenol-formaldehyde novolac, optimum molding characteristics are obtained when the novolac has ortho-ortho content of less than 70 weight percent of the total novolac composition. Actually, results are obtained when the ortho-ortho content is around 50 weight percent, the balance of the novolac consists of ortho-para and para-para linkages.

By these various types of linkage, it is meant the methylene bridging between the phenol nuclei and can be represented by the following formulas:

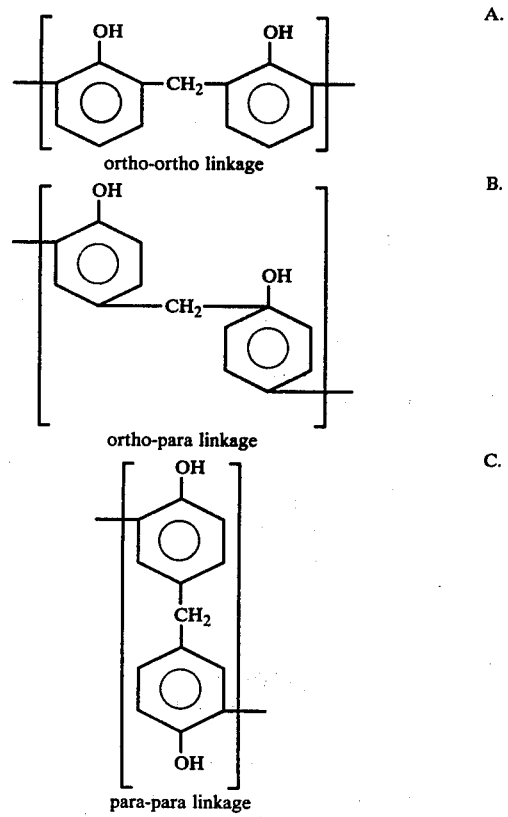

The phenol-aldehyde resin employed in the practice of this invention can be any phenol-aldehyde resin which is prepared by reacting from less than one mole to more than one mole of an aldehyde per mole of phenol under certain conditions to provide a resin. If less than one mole of an aldehyde is used, the resin so produced is commonly called a novolac. The novolac resin is generally the type that can be finely ground and requires blending thereof with an external cross-linking agent such as hexamethylenetetramine in order to provide a thermosettable resin which can be advanced to an infusible state upon exposure to elevated temperatures. While any external cross-linking agent can be employed herein, the preferred external cross-linking agent is hexamethylenetetramine. Generally, the preferred range of aldehyde employed herein to prepare the novolac is 0.5 – 0.9 moles thereof per mole of phenol and preferably 0.6 – 0.8 moles thereof. While any aldehyde can be employed herein such as formaldehyde, paraformaldehyde, acetaldehyde, butyraldehyde, furfuraldehyde, etc., the preferred aldehyde to be employed herein is formaldehyde.

When employing more than one mole of aldehyde per mole of phenol, a one-stage resin is produced which can be advanced to an infusible state by the mere application of elevated temperatures. The one-stage resin which can be employed herein is one prepared by reacting more than one mole of an aldehyde per mole of phenol and preferably 1.1 – 3.0 moles thereof. Again, the preferred aldehyde is formaldehyde. The one-stage resin best suited for the preparation of molding compounds is in the powdered form.

The term "pellet" herein means a solid of any shape including spherical, cylindrical, ellipsoidal, etc., and any variations of these shapes. However, the pellet must have one dimension of at least 1/16 inch.

The process for preparing the pellets of this invention involve extruding the resin composition through the die orifice of a screw extruder to form the pellets by comminuting the extrudate. The process further requires supplying sufficient heat to the extruder to melt the resin but not enough to cause curing of the resin. It has been found that by subjecting the resin compositions to a temperature of less than 290° F. this is sufficient to prevent curing of the resin in the extruder. Generally, the optimum temperature is 200° F. to about 240° F. However, even lower temperatures can be used depending upon the composition of the molding compound and the novolac being employed.

In the practice of the process of this invention, it may be feasible to rapidly cool the pellets as they are comminuted in order to prevent advancement of the resin and to prevent agglomeration of the pellets. However, if lower temperatures are employed in the screw extruder, more exposure of the pellets to room temperature may be sufficient for cooling purposes.

The feed material to the screw extruder in the practice of this invention may be either premixed or the individual ingredients may be fed directly to the feed hopper of the screw extruder. The materials may be so fed to the screw extruder either at room temperature or at elevated temperatures. If at elevated temperatures, it has been found that 150° F. to 250° F. have been found suitable.

The fillers that can be employed herein are well known in the phenolic molding compound art. These include such fillers as asbestos fibers, wood flour, cotton flock, cellulose flock, wool flock, aluminum silicate, calcium carbonate, talcs, glass fibers, etc. and any combination of these or other known fillers employed in the phenolic molding composition art. In addition, there is also employed such additives as lime, stearic acid, etc.

The metallic salts of long chain fatty acids that can be employed herein in place of the zinc stearate used in the Examples with the same results are lithium, sodium, potassium, magnesium, calcium, barium, zinc, cadmium and aluminum salts of saturated or unsaturated, branched or straight chained, mono- or di-basic fatty acids of 8–20 carbon atoms which include such acids as palmitic acid, stearic acid, lauric acid, oleic acid, pimelic acid, sebacic, adipic, ricinoleic acid and palmitoleic acid. The amount employed is 0.5 – 2.0 weight percent based on weight percent of pellets employed. The preferred metallic salt of a long chain fatty acid to be employed in the practice of the invention is zinc stearate.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A process for preparing a heat fusible thermosettable molding composition in pellet form which composition comprises in admixture a thermosettable phenol-aldehyde resin and a filler and which process consists of (a) feeding a heat fusible thermosettable molding composition at room temperature to a screw extruder, (b) advancing the molding composition through the screw extruder while subjecting said molding composition to an elevated molding temperature of less than 290° F. for a sufficient time to render the phenol-aldehyde resin molten, (c) extruding the said composition through a die orifice of the said extruder, and (d) comminuting the extrudate into pellets having a relatively smooth surface and having one dimension of at least 1/16 inch.

2. A process for preparing a heat fusible thermosettable injection molding composition comprising a mixture of a thermosettable phenol-aldehyde resin, a filler, and a metallic salt of a long chain fatty acid of 8–20 carbon atoms, which process comprises the steps of:
   (a) feeding a heat fusible thermosettable molding mixture comprised of phenol-aldehyde resin and filler to a screw extruder at room temperature;
   (b) advancing the thermosettable molding mixture through the screw extruder while subjecting said molding mixture to an elevated molding temperature of less than 290° F. for a sufficient time to render the phenol-aldehyde resin molten;
   (c) extruding the molding mixture through a die orifice of the extruder;
   (d) comminuting the extrudate into pellets having a relatively smooth surface and having one dimension of at least 1/16 inch;
   (e) rapidly cooling the pellets; and
   (f) blending the pellets with a metallic salt of a long chain fatty acid of 8–20 carbon atoms.

3. The process of claim 2 wherein the extrudate is rapidly cooled as it is comminuted into pellets.

4. The process of claim 2 wherein the temperature to which the molding composition is subjected in the extruder is 200°– 240° F.

5. The process of claim 2 wherein the phenol-aldehyde resin is a phenol-formaldehyde novolac.

6. The process of claim 2 wherein the molding composition fed to the extruder is at room temperature.

7. The process of claim 2 wherein the molding composition fed to the extruder is preheated to a temperature of 150°–250° F.

8. The process of claim 2 wherein the ingredients of the molding composition are fed separately to the extruder.

9. The process of claim 2 wherein the ingredients of mold composition are premixed before feeding to the extruder.

* * * * *

UNITED STATES PATENT AND TRADEMARK OFFICE
CERTIFICATE OF CORRECTION

PATENT NO. : 4,144,302
DATED : March 13, 1979
INVENTOR(S) : Thornton R. Calkins

It is certified that error appears in the above-identified patent and that said Letters Patent are hereby corrected as shown below:

Column 3, line 23, delete "filler" and insert
-- fibers --.

Signed and Sealed this

Second Day of October 1979

[SEAL]

Attest:

RUTH C. MASON
Attesting Officer

LUTRELLE F. PARKER
Acting Commissioner of Patents and Trademarks